(No Model.)
W. J. FOLLETT.
PACKING HOLDER FOR HORSESHOES.
No. 372,662. Patented Nov. 8, 1887.
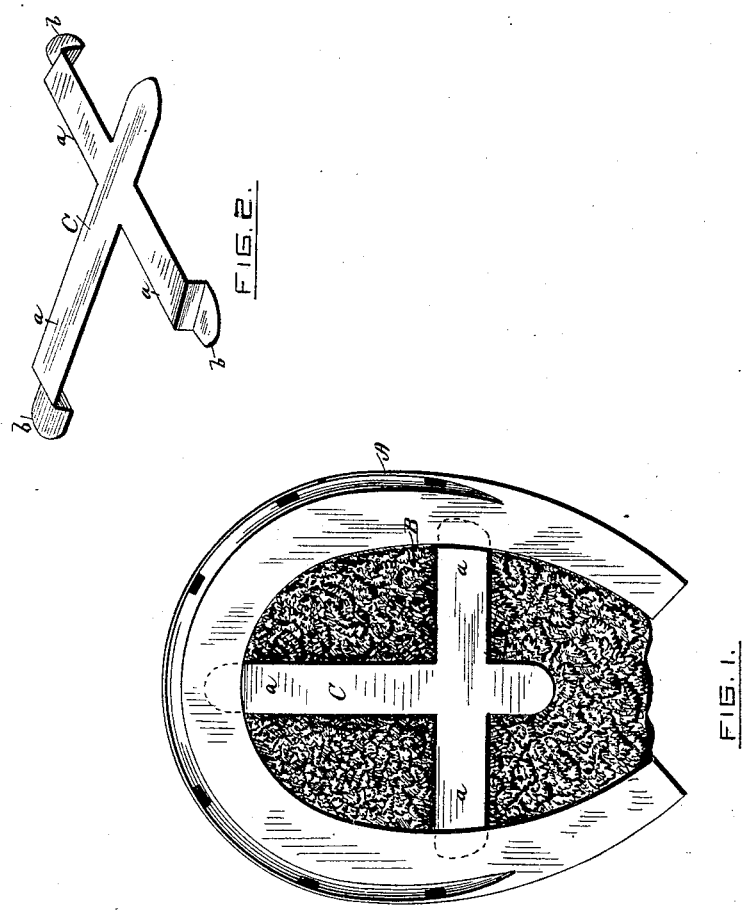
WITNESSES:
Chas. F. Schmelz
Henry Brown
INVENTOR:
Willis J. Follett
by S. Schofield
Attorney.

UNITED STATES PATENT OFFICE.

WILLIS J. FOLLETT, OF NORTH ATTLEBOROUGH, MASSACHUSETTS.

PACKING-HOLDER FOR HORSESHOES.

SPECIFICATION forming part of Letters Patent No. 372,662, dated November 8, 1887.

Application filed May 2, 1887. Serial No. 236,878. (No model.)

*To all whom it may concern:*

Be it known that I, WILLIS J. FOLLETT, a citizen of the United States, and a resident of North Attleborough, in the county of Bristol and State of Massachusetts, have invented a new and useful Improvement in Packing-Holders for Horseshoes, of which the following is a specification.

The hoof of a horse, when continually standing in a stable, is liable to become dry and hard and thus lose its vitality, and it is highly desirable to provide suitable convenient means for preserving the hoof in its proper moist and elastic condition under such circumstances; and my invention consists in an improved spring-holder for removably securing a moistened packing within the opening of the horseshoe, as hereinafter fully set forth.

Figure 1 is a bottom view of the horseshoe provided with the interior moist packing and the spring-operated packing-holder. Fig. 2 is a perspective view of the spring-holder shown in Fig 1.

In the accompanying drawings, A represents the horseshoe, which is to be attached to the hoof as usual.

B is a moist packing, preferably formed of sponge, which, when properly soaked, will retain its moisture for a comparatively long time in its position between the hoof of the horse and the stable-floor. The sponge, or other moist packing, B, is retained in its position under the central portion of the hoof by means of the spring-operated holder C, which is made of flat spring-stock, with the attached arms $a\ a\ a$, which, with the rearwardly-projecting spur $c$, form a cross, as shown in Figs. 1 and 2, the said arms being offset at their ends for about the thickness of the shoe and provided with the attaching-lips $b\ b\ b$, which enter the narrow space between the inner side of the shoe and the hoof, thus serving to hold the packing B securely.

In putting the parts together, the packing B is first inserted in its proper position and the spring-holder C caught, with two of its attaching-lips $b$, at the back of the inner portion of the shoe and between the same and the bottom of the hoof. Then the other attaching-lip $b$ is inserted in position by springing the arm of the holder, thus firmly securing the packing B in place, as shown in Fig. 1.

My improvement differs from all others of this class, in the fact that it is to be attached to the shoe and withdrawn therefrom by direct movement to or from the hoof, and it is not to be attached by means of laterally-moving springs or locking-catches, as in all such devices heretofore employed for this purpose. Therefore the packing-holder will not tend to become detached from the hoof by any possible movement of the same by the horse while in the stable. The packing-holder C is held at the three points $b\ b\ b$, which are not capable of direct lateral movement with relation to each other. The said holder can therefore only be removed by a direct pull upon one of the spring-arms; and this is an impossible movement for the horse to produce, even with a most powerful kick, owing to the extreme lightness of the flat spring and its strong hold at the back of the shoe.

I claim as my invention—

As a new manufacture, a packing-holder for horseshoes, made of spring sheet metal, and having the rigidly-connected arms $a\ a\ a$, provided with attaching-lips $b\ b\ b$, and the rearward arm, $c$, which forms the head of a cross with the arms $a\ a\ a$, the said arms being incapable of lateral movement with each other, substantially as described.

WILLIS J. FOLLETT.

Witnesses:
SOCRATES SCHOLFIELD,
CHAS. F. SCHMELZ.